Oct. 31, 1933.   J. W. HARRIS   1,932,405
PROCESS FOR THE TREATMENT OF LIQUIDS
Filed June 27, 1928   3 Sheets-Sheet 1
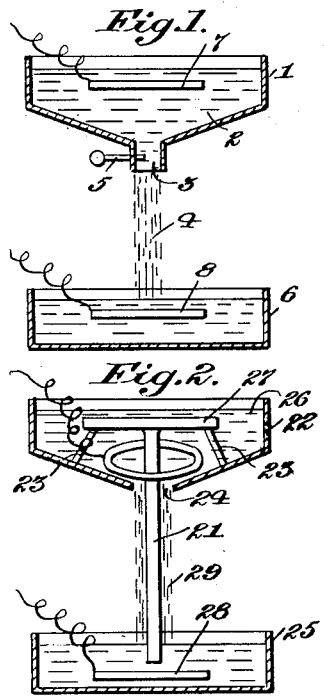
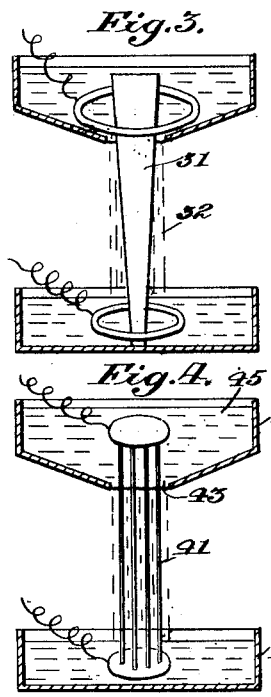
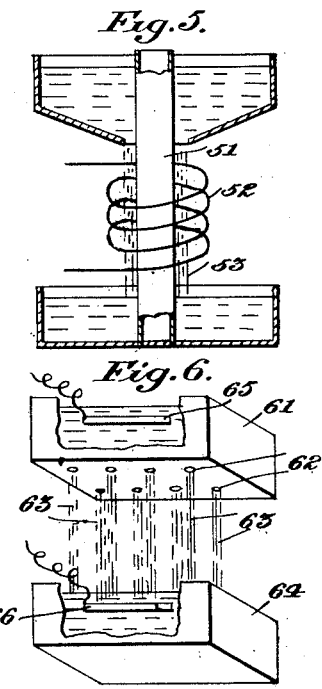
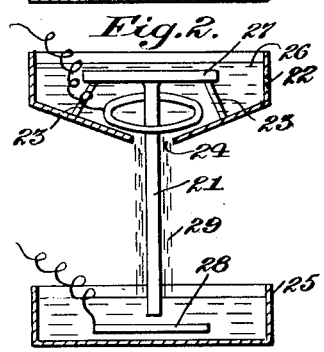
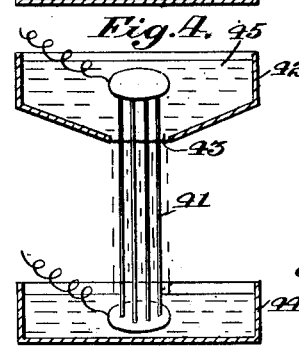
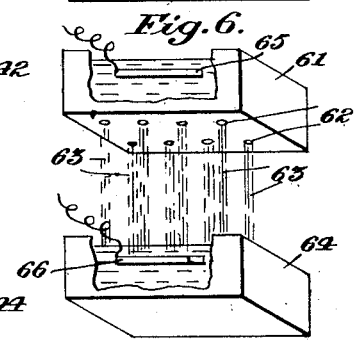
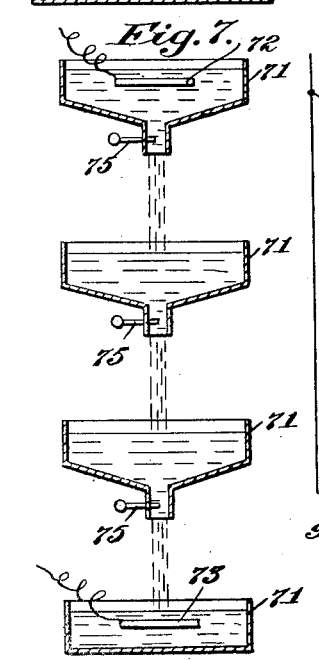
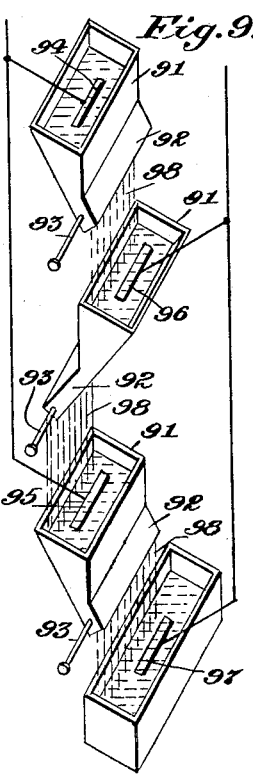
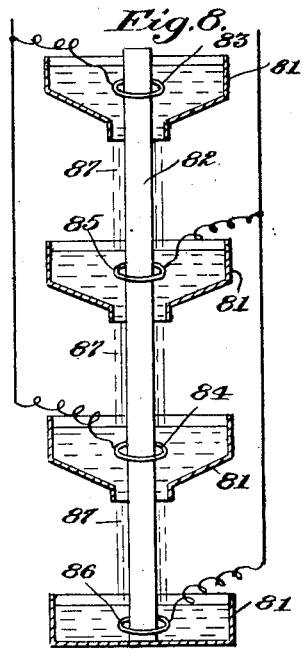
Inventor:
Joseph W. Harris Oct. 31, 1933.  J. W. HARRIS  1,932,405
PROCESS FOR THE TREATMENT OF LIQUIDS
Filed June 27, 1928  3 Sheets-Sheet 2
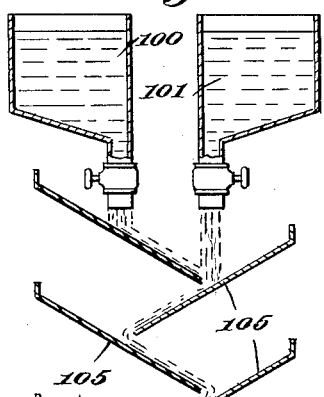
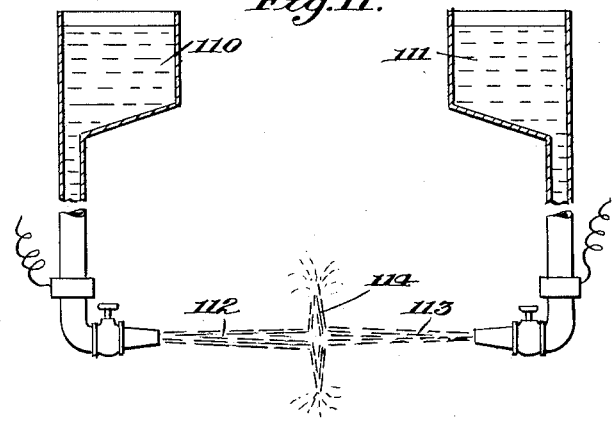
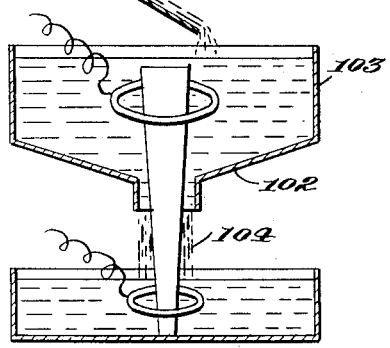
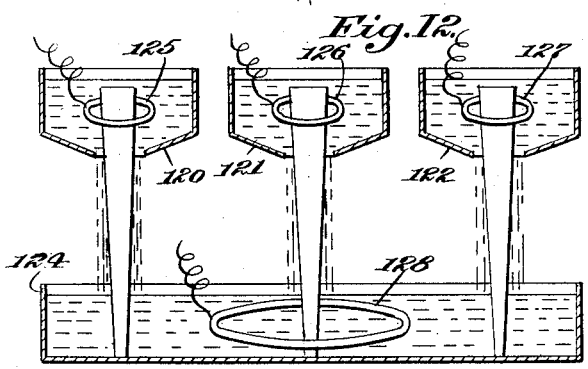
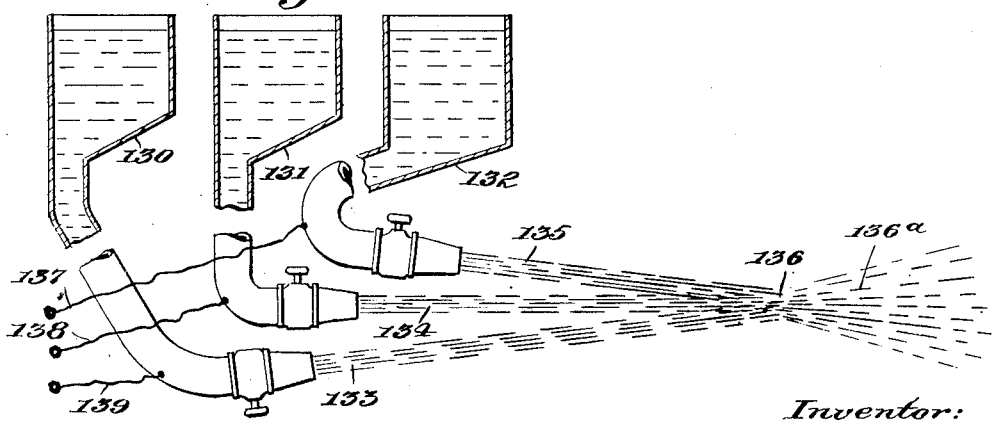
Inventor:
Joseph W. Harris

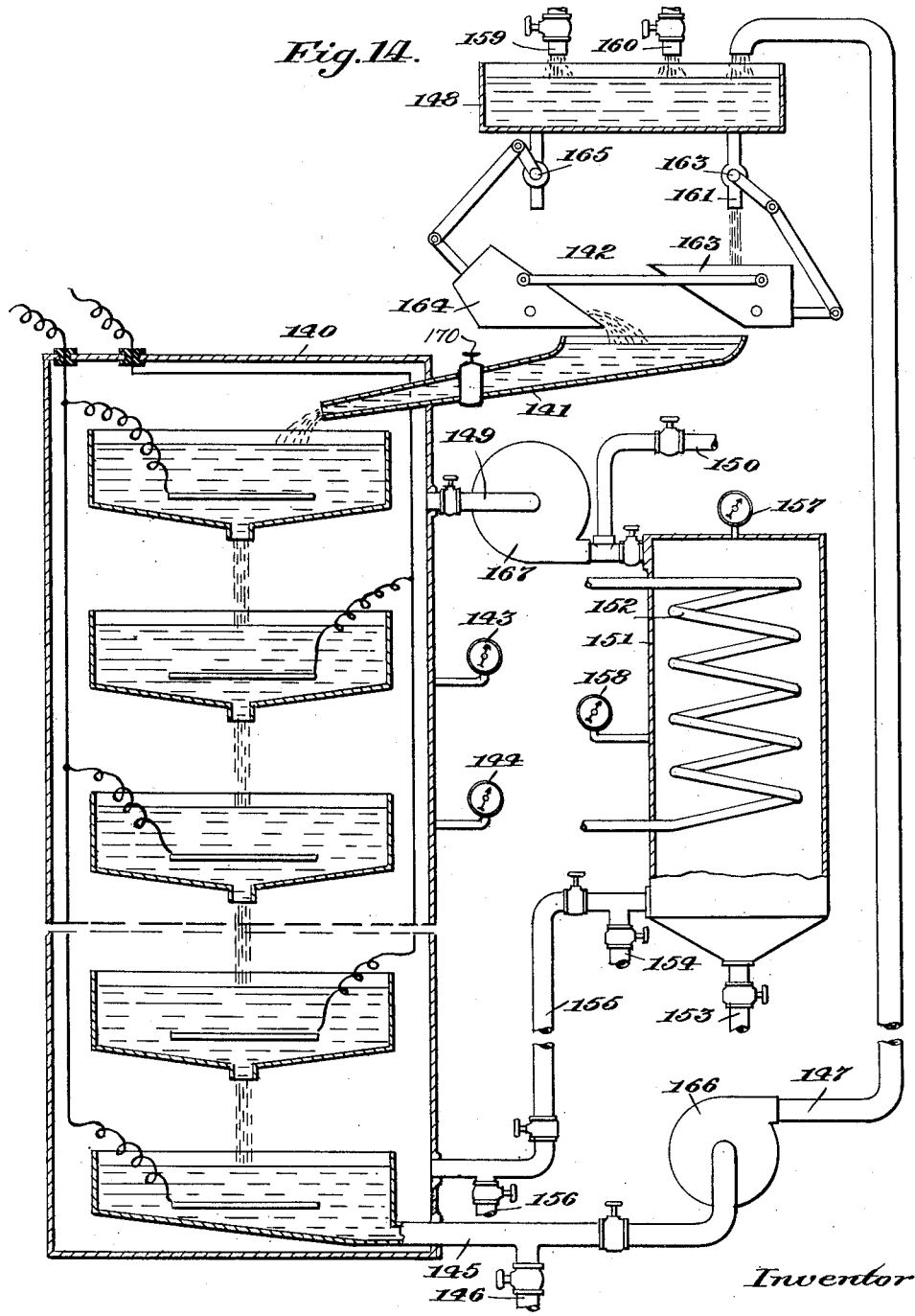

Patented Oct. 31, 1933

1,932,405

UNITED STATES PATENT OFFICE 1,932,405

PROCESS FOR THE TREATMENT OF LIQUIDS

Joseph W. Harris, Washington, D. C.

Application June 27, 1928. Serial No. 288,792

25 Claims. (Cl. 202—64)

This invention relates to processes of and apparatus for the treatment of liquids, and more particularly to the arts of distillation, evaporation, and concentration of liquids, or of liquefied substances, and the recovery of vapors therefrom, and also the recovery of solids which separate from the concentrated liquid, and further relate to a new system of effecting or carrying out chemical reactions.

Among the objects of the invention are—

To provide a method in which distillation, evaporation, concentration of liquids may be continuously carried out by subjecting continuously flowing streams of the substance to be treated to selective and graduated heating, under conditions of controlled temperature and pressure;

To provide a method in which the maximum desired heat is applied to relatively small volumes of liquid, the small volume of liquid having a relatively enormous surface from which distillation and evaporation may be efficiently effected, without contamination of the substance from the material of the container;

To provide a method of electrically heating flowing streams of liquid having a relatively small volume but enormous surface;

To provide a new method of effecting chemical reactions in mixed flowing streams of solutions of selected chemicals;

To provide apparatus for carrying out the processes in which a flowing stream or streams of liquid are electrically heated and the stream or streams exposed to an atmosphere at a desired pressure, the liquid being distilled, evaporated, or concentrated, while in the form of flowing streams, and the vaporized portion removed, the body of the liquid being circulated through the apparatus until the desired treatment has been completed; and in which apparatus the vaporized portion may be passed through a condensing apparatus for selectively removing desired portions, the remaining portions either being returned to the system or removed from the system as desired.

Other objects of the invention will appear to those skilled in the art upon reading the specification.

The accompanying drawings illustrate diagrammatically several types of apparatus which may be used to practice the invention:

Figures 1 to 9 inclusive illustrate several types of apparatus embodying the broader principles of the invention.

Fig. 10 illustrates the mixing of solutions to be subsequently treated, the solutions undergoing a chemical reaction which is completed in the electrically heated stream.

Fig. 11 illustrates projecting two jets of liquid, under pressure, the liquids meeting and forming a disc of liquid, the liquid jets carrying an electric heating current.

Fig. 12 illustrates an apllication of star connected three phase alternating current to the system.

Fig. 13 illustrates an application of delta connected three phase alternating current to three independent and controlled jets of liquid, the jets converging in a junction, as shown; the liquids may be of the same composition, or of different compositions, and chemically reacting with each other upon mixing at the junction; and Fig. 14 illustrates diagrammatically one form of a complete installation of the entire system.

In Fig. 1, a suitable receptacle 1, may be continuously or intermittently supplied with a solution 2 from any source, the solution carrying chemical electrolyte compounds which will increase its conductivity, the liquid continuously flowing from the opening 3 in the bottom as a stream 4 into a receiver 6, from which the liquid may be continuously or intermittently removed for re-treatment or otherwise, and may be controlled by the valve 5. The receptacle 1 and receiver 6 contain suitable electrodes 7, 8, respectively, which are immersed in the liquid and which may be connected to a suitably controlled supply of alternating current which will heat the stream 4 of the liquid to a desired temperature, and when alternating current is used, without electrolysis of the solution. The heated stream 4 will undergo distillation or evaporation from its surface, and may be concentrated to a greater or less degree as desired, the repeated treatment of the liquid in the apparatus as shown in Fig. 14, producing the desired change. Chemical reactions may also be effected in the apparatus, when different liquids are supplied, as shown in Fig. 10, the reaction being completed upon the temperature of the liquid stream 4 being raised to the desired degree, and vaporizable reaction products, if any, being removed by evaporation or distillation from the heated stream 4. Periodically, the liquid may be removed from the system if desired, and allowed to crystallize, the mother liquor being returned to the system for further treatment.

In Fig. 2, an insulating core 21, preferably hollow so as not to absorb too much heat, is shown supported in the upper tank 22 by supports 23, the score 21 projecting through the opening 24 and extending into the tank 25. The liquid 26 flowing through the opening 24, flows down and around the core 21, thereby maintaining a continuous electrically conducting stream 29. It is known that a falling stream of liquid tends to separate into a broken stream, a succession of drops, due to the acceleration of the falling stream by gravity, this separation of the liquid would interrupt the electric current. This tendency to separate is augmented in the present invention, due to the evaporation or distillation of some part of the liquid stream by the heat generated by the electric current. By permitting the liquid to flow over a surface, the tendency to separate into a broken stream is delayed, and where the distance is not too great, the falling stream remains intact, but thinner at the bottom. The tanks 22 and 25 contain electrodes 27 and 28 to deliver electric current to the liquid. The heat generated by the electric current in the falling stream will be partly absorbed by the core 21, and the latter is accordingly made hollow, as above noted, to reduce the heat losses.

In Fig. 3, a different type of hollow core 31 is used; the tapering form of the core shown provides a progressively reduced surface for the liquid 32 to flow over, and when correctly sized for a given liquid under given operating conditions, will serve to maintain a liquid film of substantially uniform thickness or cross section as desired, and thereby counteract the tendency of the liquid to separate into drops due to the reduction in volume of the liquid caused by losses from evaporation, and the increased acceleration of fall due to gravity.

In Fig. 4, a multiplicity of electric conductors 41, preferably as wires, which wires may also be regarded as a conducting substance in the body of the exposed flowing stream of liquid to be treated, extend from an upper tank 42 through the opening 43 to the lower tank 44. This form of apparatus is used when the liquid 45 to be treated is poorly conducting, or non-conducting, and may be used in the distillation of petroleum, etc. When a poorly conducting liquid becomes more conducting, as for example, when it is heated, the electric current will divide, passing through the liquid as well as the wires, in accordance with the known laws of the distribution of currents in parallel circuits.

In Fig. 5, a central core 51 of thin wall metal tubing is used or the core may consist of glass or thin porcelain tubing, with a metal coating deposited upon the surface. The core 51 may also have the shape of the core 31 shown in Fig. 3. The metal used should be of a material that is not corroded by the liquid treated; certain alloys may be used for this purpose. The core is surrounded with a coil of wire 52, which is electrically connected to a source of alternating electric current, and thereby functions as the primary coil of a transformer, the metal core 51 and liquid stream 53 functioning as the secondary; the alternating current will induce a secondary current in the metal 51, and also in the liquid stream 53, and heat both sufficiently to distill or evaporate a part of the liquid 53 flowing over it. The strength of the current flowing through the coil 52 would be controlled in any known way, to generate the desired amount of heat in the secondary circuit, including the metal core 51 and the stream of liquid 53, the amount of heat generated therein would be varied according to the liquid being treated and also the particular treatment desired.

In Fig. 6 an upper tank 61 is provided with a multiplicity of outlet spouts 62 through which separate streams of liquid 63 will flow into the tank 64. Electrodes 65 and 66 are used to supply the desired electric current. The streams of liquid 63 should be separated from each other a sufficient amount to avoid the commingling together or converging of the streams, due either to the mechanical effects of draughts of air or other gases or vapors; or to the electrical effects of the attraction of parallel electric currents, including the "pinch effect" when the currents are very strong, or to the combined effects of both. An objection to the commingling of the several streams is that the surface of liquid exposed for evaporation or distillation is reduced.

In Fig. 7 a bank of tanks 71, shown located vertically to each other is electrically connected in series through the electrodes 72, 73, the liquid flowing from the upper to the lower tank, through the bank of tanks, completing the circuit. While the type of tank illustrated in Fig. 1 is shown in Fig. 7, any of the types of tanks illustrated in this specification may be substituted and electrically operated in the manner described. The falling streams of liquid may be controlled by valves 75.

In Fig. 8 a bank of tanks 81 located vertically, and provided with a central hollow column 82, is shown with the tanks electrically connected in parallel. Electrodes 83 and 84 are connected to one side of the circuit, and electrodes 85 and 86 are connected to the other side of the circuit. The liquid flows in streams 87 from the upper tank through the bank of tanks, around the column 82, to the bottom tank. Instead of using a column of uniform diameter a tapering column, or a vertical series of tapering columns, may be used, such as illustrated in Fig. 3.

In Fig. 9, a bank of tanks 91 having wide outlet spouts 92, that will discharge a thin wide stream 98 of liquid, resembling a "sheet" of liquid, is shown. Such a thin sheet of liquid will expose a very large surface for distillation and evaporation. The quantity of liquid in each stream may be controlled by the valves 93. The tanks are electrically connected in parallel through electrodes 94 and 95 with one side of the circuit, and 96 and 97 on the other side of the circuit.

Fig. 10 illustrates a method of mixing a plurality of different solutions from separate sources, and finally effecting a desired chemical reaction between them and electrically distilling or evaporating the mixed solutions. In this figure, two tanks, 100, 101, with valved outlets, discharge regulated quantities of liquids to a series of mixing baffles 105, the thoroughly mixed liquid flowing into an electrical evaporator 102, the desired chemical reaction taking place partly on the baffles and upper tank 103, and being completed in the electrically heated stream 104. A series of the electrical tanks may be used when desired, as in Figs. 7, 8, 9 and 14, to complete the reaction.

In Fig. 11, controlled volumes of different solutions from several tanks 110, 111, at a sufficient height to give the desired hydrostatic pressure, or supplied from sources under pressure, are brought together for chemical reaction. The liquids under the desired pressure are delivered in opposed jets, 112, 113, and meet, forming a liquid disc 114, the chemical reaction being effected in the heated liquid disc. Evaporation and distillation of some of the products will also take place in the jets and the disc. In addition to being heated, the liquids in the jets will be under an electrical stress, when direct current is used, which will facilitate the reaction. The liquid from the disc 114 may be further treated in the apparatus shown in Fig. 14, if desired.

In Fig. 12, a plurality of tanks, three of which are shown, 120, 121, 122, each delivering similar or different liquids to the tank 124, are electrically connected to a three phase system, using the star connection, with electrodes 125, 126, 127, 128, properly connected to the three phase supply. The liquid collecting in tank 124 may be further treated in the apparatus shown in Fig. 14, if desired.

In Fig. 13, a plurality of valved tanks, three of which, 130, 131, 132, are shown, each delivering suitably separated jets of similar or different liquids 133, 134, 135, which meet at a suitable point 136; the nozzles of the tanks are electrically connected by wires 137, 138, 139 and are delta connected to a suitable source of three phase electric supply. The liquid in the jets will be electrically heated, and will undergo evaporation and concentration. The electric circuit is completed at the junction 136 of the liquid jets; a desired chemical reaction taking place in the junction, and in the liquid after leaving the junction; the combined liquids 136—A from the junction 136 may be further treated in the apparatus shown in Fig. 14, if desired. The separate liquids will also be subjected to controlled distillation or evaporation, or concentration, in the jets 133, 134, and 135.

In Fig. 14 is shown, diagrammatically, a continuously operating installation comprising an electrical distilling, evaporating, or concentrating element 140, in which may be placed any of the types of electrical treating cells described herein, for example, see Figs. 1 to 13 inclusive, supplied with electric current from any suitable source. The liquid is delivered through the duct 141 containing the valve 170 by an intermittent source of supply 142, described hereafter. The electrical treating element 140 is provided with a pressure gauge 143, and a thermometer 144. The treated liquid is removed at the bottom through pipe 145, and may be discharged through pipe 146; or may be pumped by pump 166 through pipe 147 to the vat 148. Gases or vapors may be pumped by pump 167 from the electrical treating element 140 through pipe 149 and discharged to the atmosphere, or otherwise disposed of through pipe 150; or may be sent through a condenser 151, cooled by pipe 152, the condensed liquid being withdrawn through pipe 153, and any uncondensed products either discharged to the atmosphere, through pipe 154, or returned to the electrical treating element 140 through pipe 155 to be re-passed through the condenser along with additional gases or vapors from the electrical treating element. When desired, controlled quantities of air or other gases may be admitted through the pipe 156, either alone or mixed with the returned gases from the condenser. A pressure gauge 157 and a thermometer 158 are shown on the condenser. The intermittent supply device 142 may be of any type which interrupts the supply of liquid, and thereby electrically insulates this part of the system, delivering separated and insulated quantities of liquid to the launder 141. All of the parts of the intermittent supply device are preferably made of glazed stone ware, or other approved insulating material. The vat 148 also receives additional controlled supplies of liquid through the pipes 159, 160, when desired. The intermittent supply is shown delivering liquid through pipe 161 to bucket 162; when this bucket is filled, it tilts, thereby closing valve 163, resetting bucket 164 and opening valve 165, also discharging the contents from bucket 162 into the launder 141; the intermittent supply device is continuous in operation, buckets 163 and 164 being filled and discharged in succession automatically.

The system described herein may be used for the concentration of sulphuric acid, sodium hydroxid, or many other solutions; or the distillation of alcohol and water solutions, distillation of petroleum products or of many other liquids, and as a means for effecting chemical reactions, such as the manufacture of ether by heating a stream of ethyl-sulphuric acid, and other reactions.

The system may also be used for the evaporation and concentration of solutions of various chemical compounds and salts, the concentrated liquor may be withdrawn and be allowed to separate crystals of salts in separate crystallization tanks, the mother liquor being then returned to the system. When distillation is practiced in the apparatus, the vapors may be subjected to fractional condensation by controlling the temperature in the condenser, the uncondensed vapors being returned, if desired, for further treatment with additional vaporized products.

The clause in the claims "exposed streams passing through space" means that the streams of liquid are exposed on all sides as thin streams to increase the surface from which evaporation takes place, as shown in Figures 1 and 9; and in Figure 4 where the liquid flows as an envelop or coating over, or over and between, the heating conductors 41, or over the electrically heated surface 51 in Figure 5, thereby exposing the total surface of the liquid to evaporation; as distinguished from a liquid supported by or flowing over non-electrically heated surfaces, in which latter case the surface of the liquid in contact with the non-conductor would not be heated thereby, and said surface in contact with the non-conductor would not be exposed to evaporation.

The system is economical in that the desired heat is generated in a limited volume of a flowing liquid having a relatively enormous surface, the flowing stream being exposed to a circulating atmosphere of controlled composition, under controlled conditions of temperature, pressure, and velocity.

I claim:

1. A method for the concentration of liquids containing vaporizable matter, and a substantial amount of dissolved chemical electrolyte compounds, which comprises delivering the same as exposed streams passing through space, subjecting said exposed streams to the heating action of electricity conducted by a conducting substance in the body of said streams, heating said streams thereby, and evaporating a portion of the mass from the surfaces of said exposed streams.

2. A method for the concentration of liquids containing vaporizable matter, and a substantial amount of dissolved chemical electrolyte compounds, which comprises delivering the same as exposed streams passing through space, subjecting said exposed streams to the heating action of controlled quantities of electricity, conducted by a conducting substance in the body of said streams, under controlled conditions of temperature, and evaporating a portion of the mass from the surfaces of said exposed streams.

3. A method for the concentration of liquids containing vaporizable matter, and a substantial amount of dissolved chemical electrolyte compounds, which comprises delivering the same as exposed streams passing through space, subjecting said exposed streams to the heating action of controlled quantities of electricity, conducted by a conducting substance in the body of said streams, under controlled conditions of temperature and pressure, and evaporating a portion of the mass from the surfaces of said exposed streams.

4. A method for the treatment of liquids containing vaporizable matter, which comprises mixing liquids containing substantial amounts of dissolved chemical electrolyte compounds, and delivering the mixed mass as exposed streams passing through space, subjecting said exposed streams to the heating action of electricity, conducted by a conducting substance in the body of said streams, heating said streams thereby, evaporating a portion of the mass of said streams, and removing and subjecting the evaporated matter to a condensing action.

5. A method for the treatment of liquids containing vaporizable matter, and a substantial amount of dissolved chemical electrolyte compounds, which comprises delivering the same as exposed streams passing through space, subjecting said exposed streams to the heating action of electricity, conducted by a conducting substance in the body of said streams, heating said streams thereby, evaporating a portion of the mass from the surfaces of said exposed streams, removing and subjecting the evaporated portion to a condensing action, and re-treating the unevaporated residue.

6. A method for the treatment of liquids containing vaporizable matter and a substantial amount of dissolved chemical electrolyte compounds, which comprises delivering the same as exposed streams passing through space, subjecting said exposed streams to the heating action of electricity, conducted by a conducting substance in the body of said streams, heating said streams thereby, evaporating a portion of the mass of said streams, effecting chemical reactions between chemicals carried thereby, and collecting the unevaporated residue.

7. A method for the treatment of liquids containing vaporizable matter and a substantial amount of dissolved chemical electrolyte compounds, which comprises delivering the same as exposed streams passing through space, subjecting said exposed streams to the heating action of electricity, conducted by a conducting substance in the body of said streams, heating said streams thereby, maintaining said streams intact, evaporating a portion of the mass of said streams, effecting chemical reactions between chemicals carried thereby, and collecting and re-treating the unevaporated residue.

8. A method for the treatment of liquids containing vaporizable matter and a substantial amount of dissolved chemical electrolyte compounds, which comprises delivering the same as exposed streams passing through space, subjecting said exposed streams to the heating action of electricity, conducted by a conducting substance in the body of said streams, under controlled conditions of temperature, heating said streams thereby, evaporating a portion of the mass of said streams, effecting chemical reactions between chemicals carried thereby, subjecting the evaporated matter to a condensing action, and collecting and re-treating a part of the unevaporated residue.

9. A method for the treatment of liquids containing vaporizable matter and a substantial amount of dissolved chemical electrolyte compounds, which comprises delivering the same as exposed streams passing through space, subjecting said exposed streams to the heating action of electricity, conducted by a conducting substance in the body of said streams, heating said streams thereby, evaporating a portion of the mass of said streams, effecting chemical reactions between chemicals carried thereby, subjecting evaporated matter to a condensing action, collecting and re-treating a part of the unevaporated matter, adding additional chemical carrying liquid to the unevaporated matter, and passing a part of the uncondensed evaporated portion in contact with the exposed stream being electrically treated.

10. A method for the concentration of liquids containing vaporizable matter, and a substantial amount of dissolved chemical electrolyte compounds, which comprises delivering the same as exposed streams passing through space, subjecting said exposed streams to the heating action of electricity, conducted by a conducting substance in the body of said streams, heating said streams thereby, maintaining said streams intact, and evaporating a portion of the mass from the surfaces of said exposed streams.

11. A method for the treatment of liquids containing vaporizable matter and a substantial amount of dissolved chemical electrolyte compounds, which comprises delivering the same as exposed streams passing through space, subjecting said streams to the heating action of electricity, conducted by a conducting substance in the body of said streams, under controlled conditions of temperature and pressure, heating said streams thereby, maintaining the continuity of said streams, evaporating a portion of the mass of said streams, effecting chemical reactions between chemicals carried thereby, and collecting and re-treating the unevaporated residue.

12. A method for the concentration of liquids containing vaporizable matter, and a substantial amount of dissolved chemical electrolyte compounds, which comprises delivering the same as exposed streams passing through space, subjecting said exposed streams to the heating action of electricity, conducted by a conducting substance in the body of said streams, while under reduced atmospheric pressure, heating said streams thereby, evaporating a portion of the mass therefrom, and removing said evaporated portion from the region of said exposed streams.

13. A method for the treatment of liquids containing vaporizable matter, and a substantial amount of dissolved chemical electrolyte compounds, which comprises delivering the same as a plurality of separate exposed streams passing through space, each of said streams constituting a part of an electric circuit, said streams uniting in space, and evaporating a portion of the mass of said streams.

14. A method for the treatment of liquids containing vaporizable matter, and a substantial amount of dissolved chemical electrolyte compounds, which comprises delivering the same as a plurality of separate exposed streams passing through space, each of said streams constituting a part of an electric circuit, said streams uniting in space, evaporating a portion of the mass of said streams, and further treating the unevaporated liquid.

15. A method for the treatment of liquids containing vaporizable matter, and a substantial amount of dissolved chemical electrolyte compounds, which comprises delivering the same as a plurality of separate exposed streams passing through space, each of said streams constituting a part of an electric circuit, said streams uniting in space, effecting a chemical reaction in said united streams, evaporating a portion of the mass of said streams, and subjecting the unevaporated liquid to further treatment.

16. A method for the treatment of liquids containing vaporizable matter, and a substantial amount of dissolved chemical electrolyte compounds, which comprises delivering the same as a plurality of separate exposed streams passing through space, each of said streams constituting a part of an electric circuit, said streams carrying different chemicals, said streams uniting in space to close the electric circuit and to initiate a chemical reaction between said chemicals.

17. A method for the treatment of liquids containing vaporizable matter, and a substantial amount of dissolved chemical electrolyte compounds, which comprises delivering the same as a plurality of separate exposed streams passing through space, each of said streams constituting a part of an electric circuit, said streams carrying different chemicals, said streams uniting in space to close the electric circuit and to initiate a chemical reaction between said chemicals, and evaporating a portion of the mass of said exposed stream.

18. A method for the treatment of liquids containing vaporizable matter, and a substantial amount of dissolved chemical electrolyte compounds, which comprises delivering the same as a plurality of separate exposed streams passing through space, each of said streams constituting a part of an electric circuit, said streams carrying different chemicals, said streams uniting in space to close the electric circuit and to initiate a chemical reaction between said chemicals, evaporating a portion of the mass of said exposed streams, and subjecting the unevaporated liquid to further treatment.

19. A method for the treatment of liquids containing vaporizable matter, and a substantial amount of dissolved chemical electrolyte compounds, which comprises delivering the same as an exposed stream passing through space, subjecting said exposed stream to the heating action of electricity, conducted by a conducting substance in the body of said stream, heating said stream by said electricity, concentrating said exposed stream by the electrically generated heat, and recovering the resulting concentrated solution.

20. A method for the treatment of liquids containing vaporizable matter, and a substantial amount of dissolved chemical electrolyte compounds, which comprises delivering the same as an exposed stream passing through space to the heating action of electricity, conducted by a conducting substance in the body of said stream, heating said stream by said electricity, concentrating said exposed stream by the electrically generated heat, removing the matter expelled from said stream, and recovering the resulting concentrated solution.

21. A method for the treatment of liquids containing vaporizable matter, and a substantial amount of dissolved chemical electrolyte compounds, which comprises delivering the same as a broad relatively thin exposed stream passing through space, subjecting said broad thin exposed stream to the heating action of electricity conducted by a conducting substance in the body of said stream, heating said exposed stream thereby, and evaporating a portion of the mass from the surface of said exposed stream.

22. A method for the concentration of liquids containing vaporizable matter, and a substantial amount of dissolved chemical electrolyte compounds, which comprises delivering the same as broad relatively thin exposed streams passing through space, subjecting said broad thin exposed streams to the heating action of controlled quantities of electricity, conducted by a conducting substance in the body of said streams, under controlled conditions of temperature and pressure, and evaporating a portion of the mass from the surfaces of said exposed streams.

23. A method for the treatment of liquids containing vaporizable matter, and a substantial amount of dissolved chemical electrolyte compounds, which comprises delivering the same as broad relatively thin exposed streams passing through space, subjecting said broad thin exposed streams to the heating action of electricity, conducted by a conducting substance in the body of said streams, heating said streams thereby, evaporating a portion of the mass of said streams, effecting chemical reactions between chemicals carried thereby, and collecting the unevaporated residue.

24. A method for the treatment of liquids containing a substantial amount of dissolved chemical electrolyte compounds, which comprises delivering the same as broad relatively thin exposed streams passing through space, subjecting said broad thin exposed streams to the heating action of electricity, conducted by a conducting substance in the body of said streams, heating said streams thereby, effecting chemical reactions between the chemicals carried by said streams by the increase in temperature produced therein by said electric heat, and recovering the products of said chemical reactions.

25. A method for the treatment of liquids containing a substantial amount of dissolved chemical electrolyte compounds, which comprises delivering the same as broad relatively thin exposed streams passing through space, subjecting said broad thin exposed streams to the heating action of electricity, conducted by a conducting substance in the body of said stream, under controlled conditions of temperature and pressure, heating said streams thereby, maintaining the continuity of said streams, evaporating a portion of the mass of said streams, effecting chemical reactions within said streams between the chemicals carried thereby by the increase in temperature produced therein by said electric heat, and recovering the products of said chemical reactions.

JOSEPH W. HARRIS.